United States Patent [19]
Dinger

[11] 3,813,591
[45] May 28, 1974

[54] DC MOTOR SPEED CONTROL CIRCUIT
[75] Inventor: Edward H. Dinger, Waynesboro, Va.
[73] Assignee: General Electric Company, Salem, Va.
[22] Filed: Mar. 6, 1973
[21] Appl. No.: 338,615

[52] U.S. Cl. .............................. 318/331, 318/345
[51] Int. Cl. ............................................ H02p 5/00
[58] Field of Search ............................ 318/331, 345

[56] References Cited
UNITED STATES PATENTS
3,504,260  3/1970  Staples................................. 318/331

Primary Examiner—Gene Z. Rubinson
Attorney, Agent, or Firm—Arnold E. Renner; Harold H. Green, Jr.

[57] ABSTRACT

A d.c. motor control circuit of the type employing phase controlled semiconductor devices of the controlled rectifier type is provided with suitable feedback means respecting motor operation. A full wave controlled rectifier bridge supplies power to the motor armature winding from an a.c. source and means are provided for adjusting the phase angle of controlled rectifier firing in response to an error signal derived from true back emf of the motor.

6 Claims, 4 Drawing Figures

DC MOTOR SPEED CONTROL CIRCUIT

BACKGROUND OF THE INVENTION

The present invention relates generally to speed control circuits for direct current (d.c.) motors and more particularly to a speed control for a d.c. motor of the type in which the effective power supplied to the motor is a function of the effective applied voltage which in turn is a function of the percentage of time during which controlled rectifiers are permitted to conduct and supply power to the motor.

The controlled rectifiers in most common use today are semiconductor devices generally known as thyristors and the most common of the thyristors is that device known as the silicon controlled rectifier. In the ensuing discussion, the term thyristor will be used although it is to be fully understood that the term is used to designate controlled rectifiers generally. A thyristor normally conducts only in one direction and conduction is initiated by the simultaneous application of a forward bias voltage across its anode and cathode and a gating signal applied to a third or gating electrode. After conduction is initiated the thyristor will continue to conduct until such time as the voltage applied across its anode and cathode goes to a sufficiently low value to extinguish the thyristor. This value is usually about zero volts.

It is well known in the art that the speed of a d.c. motor can be made the function of the effective applied voltage. When d.c. motors are powered from an alternating current (a.c.) power source it is known that the effective voltage may be varied by employing a controllable rectifying bridge. These bridges normally consist of two thyristors and two diodes. Through the application of a suitable gating pulse to the appropriate thyristor in each of the applied voltage half cycle, the appropriate thyristor-diode path is rendered conductive. By varying the point within the half cycle that the thyristor is fired the effective voltage can be controlled. This is known in the art as phase controlling the thyristors. Some means must, of course, be provided for determining when the gating pulses will be applied to the thyristor as will be explained later. This prior art system further includes a free wheeling diode connected across the armature winding of the motor in order to prevent an uncontrolled or "runaway" condition under certain circumstances as will be more fully explained hereinafter.

Several methods are known in the prior art for controlling the time of thyristor firing. One of these methods is to attach a tachometer to the motor rotor to provide a signal which is a function of motor speed and which may, when properly calibrated be used to control thyristor firing. Tachometers are, however, expensive and represent a potential area of mechanical failure. A more common method, therefore, is based upon the fact that the counter or back electromotive force (back emf) of a d.c. motor is a function of its speed. In the type of system described above, however, the presence of the free wheeling diode renders it virtually impossible to insure that the armature voltage which can be measured is entirely due to back emf and not in part attributable to IR drop resulting from an armature current. As such, where the armature voltage is used to control thyristor firing, the effects of IR drop must be compensated for. Historically, this compensation is provided by integrating the armature voltage during time of no power application to the motor and then adjusting this appropriately for that portion of the voltage which is due to IR drop. This system suffers two basic defects; the first being an inaccuracy in the approximation of the IR compensation and the second being a time delay involved in the integration process such that the voltage supplied at the output of the integrator is delayed with respect to the actual time or the instantaneous speed of the motor.

SUMMARY OF THE INVENTION

The foregoing deficiencies of the prior art are alleviated by the control system of the present invention which provides a full wave rectification bridge having a controllable rectifier (thyristor) in each of its legs. The use of a thyristor in each of the four legs of the bridge permits the system to operate without the free wheeling diode of the prior art to thus allow the armature voltage to go in the negative direction. As such, it can be assured that the armature current will go to zero and hence that there will be no armature current for an interval within each half cycle to provide a time within each half cycle when the armature voltage is solely a function of the back emf of the motor. At this time the voltage across the armature will be the true back emf of the motor and an accurate function of its speed. In the implementation of the invention in its preferred embodiment, the system includes means to sense the armature voltage and to compare this voltage with a reference voltage which may be either manually or automatically controlled and which is proportional to the desired speed of the motor. This comparison will result in an error signal, indicative of the deviation of the motor from the desired speed, which can be applied to the circuit for the firing of the thyristors to vary the phase angle and hence the effective applied voltage and motor speed. To insure that the error signal is accurately a function of the true back emf, the present invention further includes means to determine that point of time within the operational cycle during which there is no armature current flowing and to use this determination to gate the error signal to the transistor firing circuit. The error signal is inhibited at all other times.

DESCRIPTION OF THE DRAWINGS

For a better understanding of the present invention, reference is made to the accompanying drawing in which.

DETAILED DESCRIPTION

Figure 1:
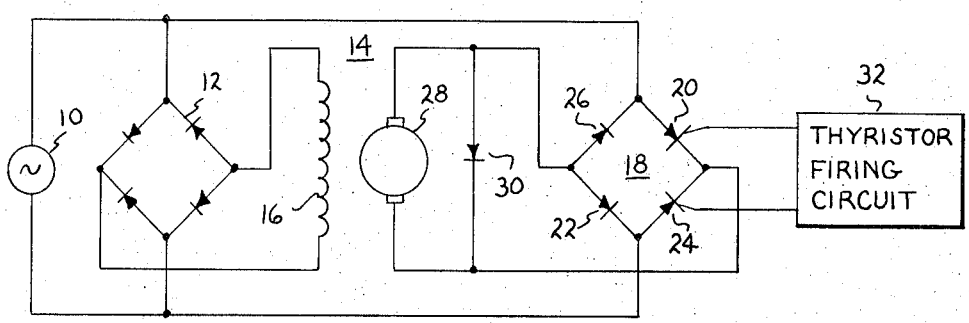
FIG. 1 is a schematic drawing of a prior art control system.

Before entering into a detailed description of the present invention it is believed advantageous to explain that which is prevalent in the art as it is known today in order to better understand the problems attendant thereto. In this regard, reference is first made to FIG.

1 which illustrates the prior art full wave speed control system as it is best known today. Referencing now FIg. 1, there is shown a source of a.c. power 10 across which is connected a full wave diode bridge 12 the output of which serves to supply rectified a.c. power to a field winding 16 of a shunt wound d.c. motor shown generally at 14. A second full wave rectification bridge 18 is also connected across the power source 10 and its output is provided to an armature 28 of the motor 14. Connected in parallel with the motor armature 28 is a free wheeling diode 30.

The bridge 18 is comprised of two thyristors and two diodes. As illustrated in FIG. 1, when the voltage of the source 10 is positive at its upper terminal and when thyristor 20 is rendered conductive (fired), a current path is established through the thyristor 20, armature 28 and from thence through the diode 22 back to the lower terminal of the source 10. Similarly, when the power source 10 voltage is positive at its lower terminal and thyristor 24 is conductive the current path is through that thyristor, the armature 28 in the same direction as before and through diode 26 back to the source 10. The effective amount of power that is delivered to the armature, which in turn governs the motor speed is a function of the point within each of the half cycles of the source voltage at which the respective thyristor 20 or 24 is fired. This, as illustrated, is a function of a thyristor firing circuit 32 which may be of any type known in the art. The earlier in the half cycle that the thyristors 20 and 24 are rendered conductive by the application of signals to the gates thereof, the greater the effective voltage delivered to the motor and hence the greater the speed.

Figure 2:
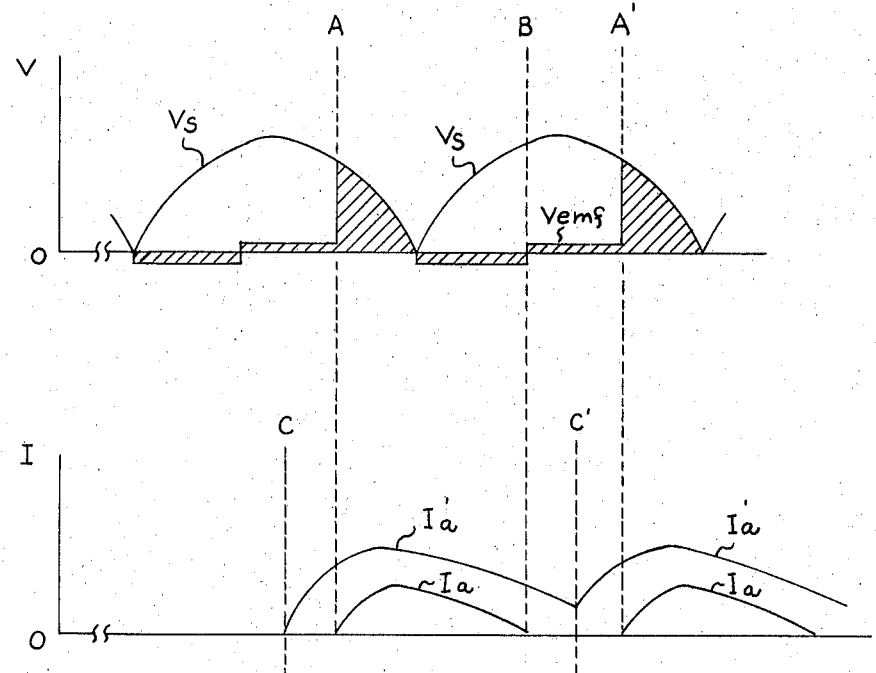
FIG. 2 illustrates voltage and current wave shapes useful in the understanding of the operation of the circuit of FIG. 1.

The operation of the circuit of FIG. 1 and the previously mentioned problems may be best understood with reference to the graphs of FIG. 2. In the upper graph of FIG. 2 voltage is plotted as a function of time. Shown in this graph is a full wave rectified sine wave designated $V_s$ which represents what would be the full wave rectification of the voltage of the source 10. The shaded area as shown in this graph represents the voltage which will appear across the armature 28 of the motor 14 as a result of the controlled operation of the thyristors 20 and 24. At points A and A' the appropriate thyristors 20 and 24 are fired, illustrated at approximately 120° into each of the half cycles. With the firing of the appropriate thyristor, the instantaneous source voltage is applied to the armature of the motor 14. As the applied voltage goes to zero at the end of a half cycle, the armature voltage drops slightly below zero due to the fact that there is a negative voltage equal to one diode drop, the drop of the diode 30, existing across the armature. This negative voltage will continue until such time as the current within the armature decays to zero at which time (point B in the second half cycle of the upper graph of FIG. 2) the current will stop and a voltage representing the back emf will appear across the motor armature. When the second thyristor is then fired on the second half cycle (point A') the instantaneous source voltage will be again applied to the motor.

The middle graph shown in FIG. 2 illustrates the armature current that will exist in the motor as a function of armature voltage. Here it is seen that with the application of a voltage to the armature (point A), a current designated $I_a$ will begin. This current will build up rather rapidly and will then start to decline at a less rapid rate as shown. The degree to which the current will build up is a function of the effective voltage applied to the motor. The curve $I_a$ of FIG. 2, illustrates that with the application of a relatively small effective voltage, the current will build up to a relatively small value and will decay prior to the next application of power through the bridge 18. This is illustrated at point B in the figure and it is at this time that an armature voltage proportional to the back emf of the motor will be present (shown as $V_{emf}$ in the upper graph).

FIG. 2 also illustrates what happens when a larger effective voltage is applied to the motor. In lower graph depiction, the firing angle of the thyristors in each of the half cycles has been moved forward such that the firing occurs at approximately 90° within each of the half cycles of the source voltage. As before the rectified source voltage is designated $V_s$ and the shaded area indicates the effective voltage applied to the motor armature. With the application of a larger effective voltage, which begins at an earlier point in time, the armature current, designated $I_a'$ in the middle graph of FIG. 2, begins to flow at an earlier time and will achieve a greater magnitude. In this situation the current will build up sufficiently such that the current does not decay to zero period to the next firing of a thyristor in the following half cycle. This is shown as point C' in the graph and illustrates that in this situation a continuous motor current will flow such that there is always a current in the armature. With a continuous armature current, there is no time during which there exists a voltage across the armature which is not in some way affected by the current and as such there always will be an IR drop and the armature voltage will never represent the true back emf of the motor.

The above are, of course, merely examples to illustrate the prevailing problem of the prior art. While the problem is uniform, the exact firing angles which will cause the current to become continuous will depend upon a number of variables, primarily the electrical characteristics of the motor used.

As previously noted, the diode 30 as shown in the FIG. 1 circuit is necessary to prevent a potential uncontrolled or runaway condition of the motor. Under certain operating conditions the motor armature current can be sustained, in the absence of the free wheeling diode, through an originally conducting thyristor over a complete half cycle of source voltage. It this situation occurs, then that originally conducting thyristor will immediately begin to apply full source voltage to the motor when its anode next goes positive even though no gating pulse is applied to the thyristor, resulting in a loss of control. The free wheeling diode prevents this occurrence by providing a low resistance shunt path to assure the complete turn off of the thyristors.

Figure 3:
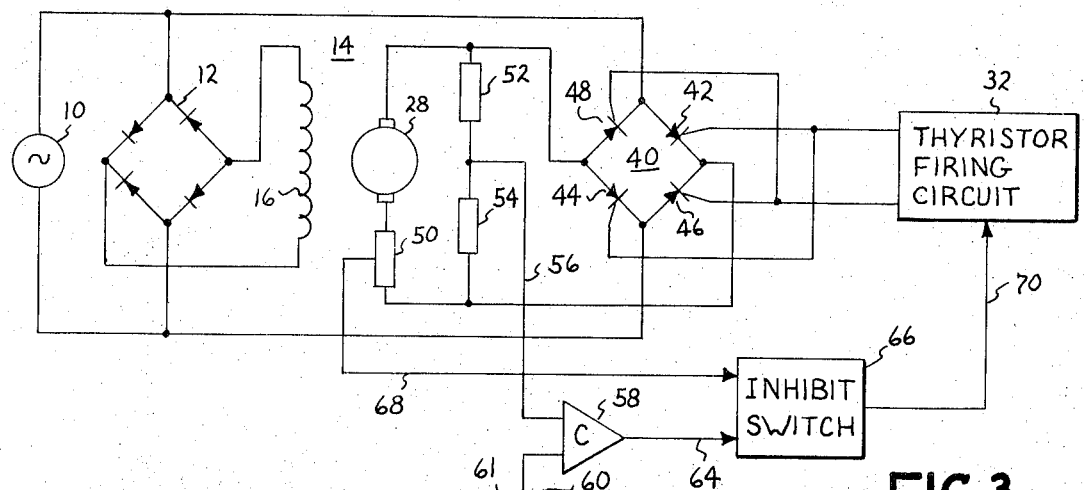
FIG. 3 is a schematic drawing of the control circuit in accordance with the present invention; and, FIG. 4 illustrates current and voltage wave shapes useful in the understanding of the operation of the circuit of the present invention.

Referencing now FIG. 3 there is shown the control circuit of the present invention in its preferred embodiment. As far as practical, the same designations are here used as were used with respect to FIG. 1. As before, there is provided a suitable source of a.c. voltage 10 across which is connected a full wave diode bridge 12 to supply full wave rectified power to a field winding 16 of the motor 14 which includes an armature winding 28. A second full wave rectification bridge, indicated at 40, is also connected across the power source 10 in a manner similar to the connection of the rectifier bridge 18 as shown in FIG. 1. The bridge 40 differs from the bridge 18 of the previous description in that the rectifier bridge 40 is made up entirely of controlled rectifiers or thyristors. The free ends of the bridge 40 are connected to the armature winding 28 such that rectified power of the desired phase relationship may be applied thereto. Shown in series with the armature 28 is a current sensing means 50 the function and description of which will be made hereinafter. Connected across the armature is a suitable means for determining armature voltage which in this case is shown as a divider network including two resistors 52 and 54 which are normally resistors of very high value to preclude the possibility of any appreciable current therethrough for reasons which will become evident as this description proceeds.

The thyristors of the bridge 40 are fired in pairs under the control of a thyristor firing circuit 32. That is, the thyristors 42 and 44 are fired simultaneously at the desired time within the applied first half cycle and in the next half cycle the thyristors 46 and 48 are fired under the control of the thyristor firing circuit 32. In a large sense, with one major distinction, the basic operation of the power application to the motor 14 via way of the bridge 40 is similar to that of the application as was described with respect to FIG. 1. That is, the thyristors of the bridge are fired at appropriate time in the half cycle and a voltage is applied to the motor. However, the inclusion of the four thyristor bridge as opposed to the two thyristor and two diode bridge depicted earlier offers one major advantage and a very basic distinction in that with the use of a full thyristor bridge the diode 30 may be omitted to permit the occurrence of a negative voltage across the armature 28.

Figure 4:
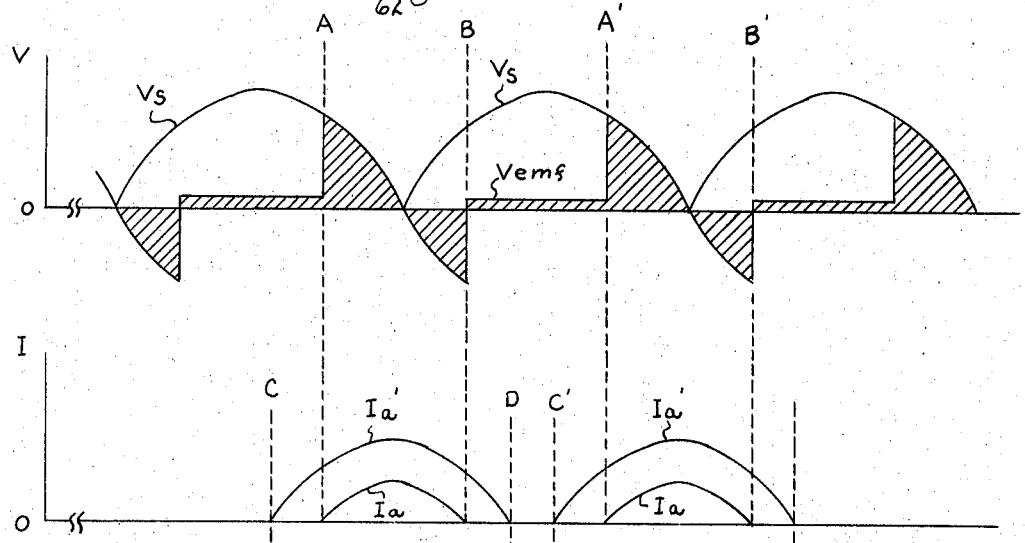
Figure 4:
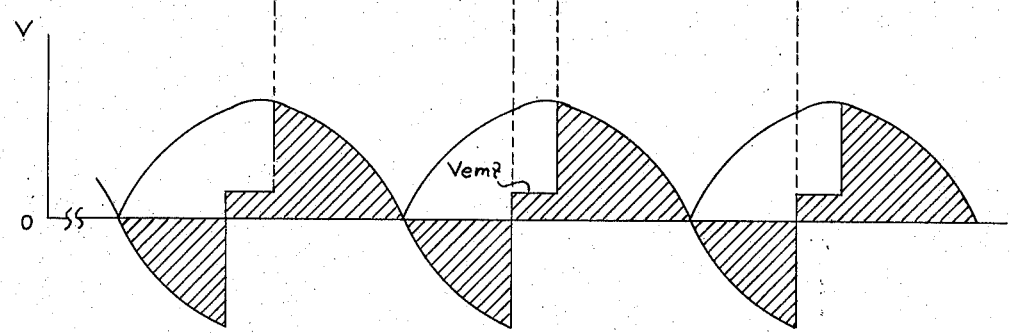

This, along with its attendant advantages, may be best explained with respect to the graphs of FIG. 4 which are similar to the graphs of FIG. 2. In the upper graph of FIG. 4 there is again shown a wave shape $V_s$ representing full rectified of the source voltage. The voltage appearing across the motor armature is again shown by the shaded portion of the graph. Referencing the upper graph of FIG. 4, the present example shows that at approximately 130° into the first half cycle the first of the thyristor pairs, for example thyristors 42 and 44, are fired to apply the instantaneous source voltage to the motor (point A).

At that point in time when the source voltage begins to go negative with respect to the motor back emf, the armature inductance will begin to develop a voltage of reverse polarity and of a magnitude just sufficient to maintain the armature current in its original direction which in this example is from the upper terminal of the source 10, through the series circuit consisting of the thyristor 42, resistor 50, armature 28 and thyristor 44. The armature current will begin to decrease at this time. If the armature current has not reached zero by the end of the half cycle, it will continue to flow in the same path, since no other path is available in that the other thyristors have not been gated on, even after the source voltage reverses polarity. The armature inductance continues to develop a negative voltage until the current reaches zero, shown at point B.

The effect of this voltage upon the armature current may be seen in the middle graph of FIG. 4. As before, with the application of a voltage to the armature (point A) a current will begin to flow. This current is designated in FIG. 4, as $I_a$. In this application, however, the current will build up to a value and then decrease fairly rapidly to zero (point B) rather than trailing off as was the previous case. This more rapid diminishment of the current results from the negative armature voltage described above. Thus the current rather than trailing off slowly will tend to approach a half sine wave having a duration of approximately the length of the positive and negative segments of line voltage applied to the armature. In the next half cycle, when the other thyristor pair is fired, as shown at point A' in the graph, the current will approximate that of the first half cycle.

As illustrated in FIG. 4 there exists a time period between the termination of the first current pulse and the initiation of the second one; that is, between time point B and time point A', during which no current flows and it is at this time that the voltage across the armature ($V_{emf}$ in the top graph) is the true back emf of the motor which is proportional to the speed of the motor.

If the firing of the thyristors of the bridge occurs at an earlier time, as illustrated in the lower graph of FIG. 4, a greater effective voltage will be applied to the armature 28. In the illustrated example the firing angle is at approximately 90° (point C in the graph). This current, $I_a'$, due to this applied voltage, is of a higher magnitude than that due to the lower applied voltage and will build up to a relatively higher value. However, because of the reverse armature voltage which is also relatively higher, the current will decrease rapidly and there again exists a time period during which there is no armature current and during which the armature voltage is solely due to the back emf of the motor. In this latter illustration the back emf is of a higher value than before indicating a higher speed.

While it might be theoretically possible to adjust the firing phase angles of the thyristors to a point where the armature current would become continuous, such is not the case with practical motors and as such there will always be a period of no armature current during which the armature voltage is a true function of motor speed.

The manner in which the true back emf may be recognized and utilized to effect the speed control of the present invention is illustrated in FIG. 3. In order to provide a suitable comparison for the armature voltage, there is included a reference signal source which provides a signal indicative of desired motor speed. This reference signal source may be of any suitable type, either manually set or set in response to some parameter in the system to which the motor is applicable. In FIG. 3 this reference signal source is illustrated as a potentiometer 60 having an adjustable wiper arm 61, connected to a suitable source of power shown as a battery 62. The setting of the wiper arm will determine the magnitude of the signal appearing thereon and this signal which is the speed reference signal forms one input to a two input comparator circuit 58.

The second input to the circuit 58 is a signal via line 56 from the juncture of the two resistors 52 and 54 connected across the armature 28. This signal will, therefore, be proportional to the instantaneous armature voltage. The comparison circuit compares the two input signals and provides an output analog error signal which is proportional to the difference between the two inputs. This error signal which has both magnitude and direction and which is proportional to the difference between the actual motor speed and the desired motor speed is applied from the comparator circuit via a line 64 as one input to an inhibit switch means 66.

The second input to the switch means 66 is from the current sensing device 50, previously mentioned, via line 68. The current sensing device 50 is shown in series with the armature and may be of any suitable device such as a resistor or magnetic amplifier which senses the presence or absence of a current within the armature winding 28. In its simplest embodiment the device 50 would be a resistor and the signal taken from that device would represent the presence or absence of a current within the circuit. By virtue of the presence or absence of the signal on line 68 to the inhibit switch 66, switch 66 is either disabled or enabled. As here employed, switch 66 will be disabled except when there is no current flowing in the armature circuit of the motor and the signal on line 68 is zero. When the signal on line 68 is zero, the inhibit switch means is enabled and the analog error signal from the comparison circuit 58 is passed via a line 70 to the thyristor firing circuit 32 which utilizes this signal to adjust the time of the firing of the thyristors within the bridge 40. Thus, if the signal from the voltage divider as it appears on line 56 is lower than the reference signal from the potentiometer 60 a negative error signal will be present on line 64 which, when applied through the switch 66 to the thyristor firing circuit 32 will serve to increase the firing angle and hence supply a higher voltage to the motor in order to increase motor speed. Conversely, if the signal on line 56 is larger than that from the potentiometer 60 a positive error signal will be applied to thyristor firing circuit thus decreasing the firing angle and reducing the voltage applied to the motor to slow it down.

It is thus seen that there has been shown and described a d.c. motor control circuit which is simple and in operation and which permits the accurate detection of speed in a very inexpensive manner by insuring that the voltage across the armature which represents the true back emf and hence the true speed of the motor is utilized to control the power application to the motor.

While there has been shown and described what is considered to be the preferred embodiment of the present invention, modifications thereto will readily occur to those skilled in the art. It is not desired, therefore, that the invention be limited to the specific example shown and described but that the appended claims encompass all which is within the true spirit and scope of the invention.

What is claimed is:

1. A speed control circuit for a direct current motor, having an armature winding and a field winding, operable from a source of alternating current input voltage, said control circuit comprising:
   a. a full wave bridge circuit for applying a rectified voltage from said source to said motor, said bridge circuit including a controlled rectifier in each leg thereof;
   b. means for phase controlling the rectifiers of said bridge circuit to vary the effective voltage applied to said motor;
   c. means for developing a speed signal proportional to the voltage across the armature winding of said motor;
   d. means to provide a reference signal proportional to a desired speed of said motor;
   e. means to combine said speed signal and said reference signal to develop an error signal proportional to the difference between the desired and the actual speed of said motor;
   f. means to provide a timing signal indicative of the absence of current in said armature winding; and,
   g. means responsive to said timing signal to apply said error signal to said means for phase controlling said rectifiers to effect a variation in the phase angle at which the bridge rectifiers are caused to conduct to thereby vary the effective voltage applied to said motor to vary the speed thereof.

2. The invention in accordance with claim 1 wherein said controlled rectifiers are thyristors.

3. The invention in accordance with claim 1 wherein said direct current motor is shunt wound.

4. A speed control circuit for a direct current motor, including an armature winding and a field winding, operable from a single phase alternating current voltage supply comprising: supply comprising:
   a. a full wave rectifying bridge circuit connecting said motor to said supply for applying a rectified voltage to said motor, said bridge circuit including a controlled rectifier in each leg thereof;
   b. means for selectively rendering said rectifiers of said bridge circuit conductive by pairs and on a phase controlled basis such that a pair of thyristors is conductive during a portion of alternate half cycles of the voltage of said supply to vary the effective voltage applied to said motor;
   c. means for deriving a speeds signal proportional to the voltage across the armature winding of said motor;
   d. means for providing a reference signal proportional to a desired speed of said motor;
   e. means to compare said speed signal and said reference signal to derive an error signal having a magnitude and a direction representing the difference between the reference signal and the speed signal;
   f. means to provide a timing signal indicative of the absence of a current in said armature winding; and,
   g. switch means responsive to said timing signal for applying said error signal to aid means for rendering the controlled rectifiers conductive to effect a variation in the phase angle at which said rectifiers are rendered conductive to thereby vary the effective voltage applied to said motor to vary the speed thereof.

5. The invention in accordance with claim 4 wherein said controlled rectifiers are thyristors.

6. The invention in accordance with claim 4 wherein said direct current motor is shunt wound.

* * * * *

UNITED STATES PATENT AND TRADEMARK OFFICE
CERTIFICATE OF CORRECTION

PATENT NO. : 3,813,591
DATED : May 28, 1974
INVENTOR(S) : Edward H. Dinger

It is certified that error appears in the above-identified patent and that said Letters Patent are hereby corrected as shown below:

Column 3, line 2, cancel "FIg" and substitute --FIG.--.
Column 4, line 25, cancel "period" and substitute --prior--.
Column 4, line 47, cancel "It" and substitute --If--.
Column 8, line 26, cancel "supply comprising:" (second occurrence).
Column 8, line 51, cancel "aid" and substitute --said--.

Signed and Sealed this sixteenth Day of December 1975

[SEAL]

Attest:

RUTH C. MASON
Attesting Officer

C. MARSHALL DANN
Commissioner of Patents and Trademarks